(12) United States Patent
Dermot

(10) Patent No.: US 11,248,636 B2
(45) Date of Patent: Feb. 15, 2022

(54) INTERFERENCE FIT FASTENER AND METHOD OF FABRICATING SAME

(71) Applicant: DUBLIN CITY UNIVERSITY, Dublin (IE)

(72) Inventor: Brabazon Dermot, Dublin (IE)

(73) Assignee: DUBLIN CITY UNIVERSITY, Dublin (IE)

( * ) Notice: Subject to any disclaimer, the term of this patent is extended or adjusted under 35 U.S.C. 154(b) by 99 days.

(21) Appl. No.: 15/767,027

(22) PCT Filed: Oct. 10, 2016

(86) PCT No.: PCT/EP2016/074236
§ 371 (c)(1),
(2) Date: Apr. 9, 2018

(87) PCT Pub. No.: WO2017/060531
PCT Pub. Date: Apr. 13, 2017

(65) Prior Publication Data
US 2019/0063478 A1  Feb. 28, 2019

(30) Foreign Application Priority Data
Oct. 9, 2015  (GB) ..................... 1517875

(51) Int. Cl.
| F16B 4/00 | (2006.01) |
| B23K 26/354 | (2014.01) |
| B23K 26/08 | (2014.01) |
| B23K 26/14 | (2014.01) |
| B23K 26/0622 | (2014.01) |
| B23K 26/352 | (2014.01) |

(Continued)

(52) U.S. Cl.
CPC .......... *F16B 4/004* (2013.01); *B23K 26/0006* (2013.01); *B23K 26/0624* (2015.10); *B23K 26/083* (2013.01); *B23K 26/0823* (2013.01); *B23K 26/14* (2013.01); *B23K 26/1476* (2013.01); *B23K 26/354* (2015.10); *B23K 26/3584* (2018.08); *B23K 2101/06* (2018.08); *B23K 2103/05* (2018.08)

(58) Field of Classification Search
None
See application file for complete search history.

(56) References Cited

U.S. PATENT DOCUMENTS 3,349,465 A * 10/1967 La Pan .................. B21D 39/06
29/890.044
4,772,773 A * 9/1988 Hashimoto ........ B23K 15/0086
219/121.64

(Continued)

FOREIGN PATENT DOCUMENTS

DE  10 2009 050 626 A1  4/2011
DE  10 2009 060 352 A1  6/2011

(Continued)

OTHER PUBLICATIONS

International Search Report, dated Jan. 9, 2017, for PCT/EP2016/074236, 7 pages.

(Continued)

*Primary Examiner* — Phuong T Nguyen
(74) *Attorney, Agent, or Firm* — Cozen O'Connor

(57) ABSTRACT

An interference fit fastener (FIG. 1) and method of fabricating same is described.

22 Claims, 15 Drawing Sheets

(51) Int. Cl.
 B23K 26/00 (2014.01)
 *B23K 101/06* (2006.01)
 *B23K 103/04* (2006.01)

(56) References Cited

U.S. PATENT DOCUMENTS

| | | | | |
|---|---|---|---|---|
| 4,865,603 | A * | 9/1989 | Noiles | A61F 2/30771 623/23.5 |
| 6,419,491 | B1 * | 7/2002 | Ricci | A61C 8/0012 433/173 |
| 2009/0277884 | A1 * | 11/2009 | Uno | B23K 26/12 219/121.61 |
| 2010/0116799 | A1 * | 5/2010 | Momoi | B23K 26/0823 219/121.71 |
| 2010/0151602 | A1 * | 6/2010 | Knollenberg | H01L 33/0095 438/29 |
| 2013/0053171 | A1 * | 2/2013 | Carlyle | A63B 60/00 473/331 |
| 2013/0133804 | A1 * | 5/2013 | Mzabi | B29D 30/48 152/451 |
| 2014/0238321 | A1 * | 8/2014 | Lettmann | B21D 53/845 123/90.1 |
| 2014/0356578 | A1 * | 12/2014 | Brandl | C22F 1/057 428/141 |

FOREIGN PATENT DOCUMENTS

| | | |
|---|---|---|
| DE | 10 2011 005 408 A1 | 9/2012 |
| DE | 10 2014 019 321 A1 | 6/2015 |
| EP | 0 223 759 A1 | 5/1987 |

OTHER PUBLICATIONS

Written Opinion, dated Jan. 9, 2017, for PCT/EP2016/074236, 7 pages.

* cited by examiner (a) (b)

(a) (b) (c)

(a)

(b)

(a)

(b)

(c)

INTERFERENCE FIT FASTENER AND METHOD OF FABRICATING SAME

FIELD OF THE INVENTION

The present invention relates to interference fit fasteners and in particular to the fabrication of interference fit fasteners or couplings using laser micro-profiling techniques.

BACKGROUND

An interference fit, also known as a press fit or friction fit, is a fastening or coupling between two parts which is achieved by friction after the parts are pushed together, rather than by any other means of fastening. Typically, for metal parts in particular, the friction that holds the parts together is often greatly increased by compression of one part against the other, which is dependent on the compressive strengths of the materials the parts are made from.

Metal to metal and metal to composite joining technologies currently used include the use of mechanical, fusion, and interference fit processes. Typical known fastening methods include press-fitting (for example, with knurled pins), shrink-fitting, nuts and bolts, screws, and rivets. Fastening of two parts through an interference fit is generally achieved by shaping the two mating parts so that one or the other, or both, slightly deviate in size from a nominal set dimension. The result is that both parts elastically, and in many cases plastically, deform slightly in order to fit together, creating a high compressive force. To break the bond formed by the interference fit there is a requirement for very high loads due to the high frictional forces between the two mating surfaces. In certain circumstances even large amounts of torque cannot turn one of them relative to the other; they are locked together and turn in unison.

Despite potential issues involved in the separation of parts that are mated or coupled to one another using an interference-fit fastening due to relative ease of manufacture, and simplicity in design they are a popular method of fastening. These fasteners are widely used in the aerospace and automotive industries via interference press fit or interference shrink fitting. Press-fit connections, in particular, are widely used within the transportation manufacturing industry for holding structural sections together through an interference fit. Interference shrink fitting is achieved either by heating of the hole section or cooling of the pin section during bonding and allowing subsequent return to a normal operating environmental temperature range to make the bond. Associated problems with these methods include the requirement of a long time for the bonding operation, the need of additional equipment, the creation of excessive plastic deformation, the initiation of materials defects, and potentially reduced bond life times.

It has been shown that shrink-fit joints can produce uneven contact pressures within regions of poor conformity leading to early joint failure, usually due to fatigue. In comparison, press-fit connections undergo plastic smoothing of long wavelength roughness, which leads to more conforming pin/hole interfacial surfaces. As a result, better mechanical joining strengths and improved joint life times can be achieved.

Press fit fastening is based on a frictional shaft-hub type of connection, produced by forcing at high pressures an oversized pin or dowel into mated drilled holes, commonly referred to as the compliant pin technique. An example of this type of joint is where the connection fit is especially critical is in the case of a shaft-bearing type configuration which is used to transmit torque. Currently these techniques require very high insertion forces, due to the tight tolerances and associated friction. As a result, even without misalignment, the process can result in joined components which suffer excessive plastic deformation. This plastic deformation can lead to two main problems: physical damage leading to premature failure of components; and additional expense for assembly and disassembly.

Current commercial methods for achieving these interference-fit connections are expensive because of the tight tolerances and high insertion forces needed. Known systems do not facilitate assembly, disassembly for maintenance, or de-commissioning. Furthermore, as indicated above, the severe plastic deformation associated with interference-fit connections can lead to premature joint failure.

Typically these interference fit assemblies also require access to both sides of the joint and tend to be multi-component in construction.

Examples of known fastening methodologies include those described in international Patent specification no. WO2005072437 A2 and corresponding US20050211680 A1 which discloses systems and methods for laser texturing of surfaces. U.S. Pat. No. 3,820,297 discloses an interference fit blind fastener. U.S. Pat. No. 5,439,339 discloses an externally threaded interference fit fastener with oppositely threaded puller. EP0630072 and corresponding U.S. Pat. No. 5,380,221 disclose an anchor pin. EP0995915 discloses a pin fastener. U.S. Pat. No. 7,153,075 discloses a press fit fastener and method of producing same.

While each of these disclosures provide solutions and have application in specific environments there continues to exist needs and desires for alternative methodologies of forming interference fit configurations. For these reasons and others, there are still problems that need to be addressed in the context of interference fit fasteners.

SUMMARY

These and other problems are addressed by the system and method of the present invention which relates to a novel, rapid, laser micro-profiling technique for producing interference fit fasteners and fasteners fabricated using such techniques.

In accordance with the system and method of the present invention, a highly focused laser is used to alter the surface texture of a metal component such as a pin, to produce an interference-fit fastening element that will be highly secure when inserted into a corresponding hole. Only the pin is textured. The hole or socket is drilled to a predetermined diameter to ensure control over the amount of interference engagement, once the pin is located therein. The pin may have a curved or arcuate outer surface which may be textured about the circumference of the pin by a rotation of the pin relative to the laser that is used to fabricate the pattern on the pin. It will be appreciated that surface geometries other than curved could be used.

A method per the present teaching enables control of the laser parameters so as to provide precise control over the features of the surface texturing, thereby giving a high degree of control over the bond strength of the joint provided between the fastening element and the corresponding aperture adapted for receiving the fastening element and for engaging therewith in an highly controlled interference-fit.

Accordingly there is provided a method and element as defined in the independent claims. Advantageous features are in the dependent claims.

These and other features of the present invention will be better understood with reference to the following drawings in which are shown, by way of example only, aspects of the present invention:

BRIEF DESCRIPTION OF THE DRAWINGS

The present invention will now be described with reference to the accompanying drawings in which:

FIG. 10B showing cross section view of pin, showing peak to peak width and peak to valley height;

FIG. 11 (b) shows the results of a pattern with 20% overlap laser scanning;

FIG. 15(c) shows a pattern resultant from use of a laser operating at 300 W, 100 Hz and with 0% overlap;

DETAILED DESCRIPTION OF THE DRAWINGS

Exemplary arrangements of the system and method provided in accordance with the teaching of the present invention will be described hereinafter to assist with an understanding of the benefits of the present invention. It will be appreciated and understood that the following is exemplary of the type of surface fixation that could be provided and is not intended to limit the present invention to any one specific arrangement as modifications could be made to that described herein without departing from the scope of the invention.

A method per the present invention is performed by laser micro-profiling of a substrate surface to form the fastening member such as a pin which has application in the formation of an interference fit fastener. A pin per the present teaching may be used in combination with a corresponding receiver to provide an interference fit coupling or fastener. A process per the present teaching is effective for a wide range of pin diameters (e.g. from 0.1 mm to tens of meters in diameter), however most applications are expected to fall within the typical pin diameter ranges of 3 mm to 100 mm in diameter.

The method of the present invention, which is also referred to by the inventor as "Laser Surface micro-Profiling" (LSmP), is achieved by scanning a substrate beneath a pulsating laser beam or by scanning the pulsating laser beam over the surface (e.g. via galvanometer) to achieve localised melting and or ablation directly on the pin material surface. The method of the present invention provides surface microprofiles based around patterns which can be well-defined Moiré patterns and pre-determined in form. The combination of this novel method of producing a pre-determined pattern on a substrate by micro-profiling finds application across a number of industries including in the defined interference fit joints that are used within the transportation industry.

Figure 8:
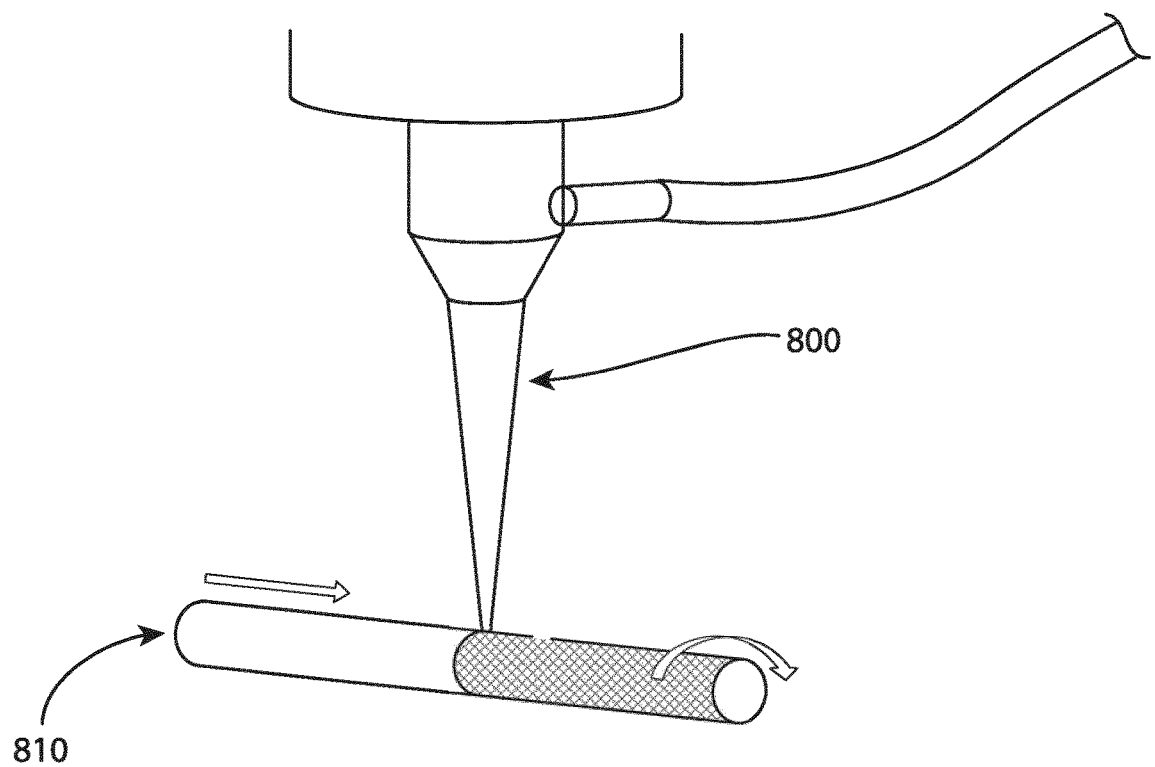
FIG. 8 is a schematic showing components that may be used in fabricating of a surface textured pin per the present teaching.
Figure 18:
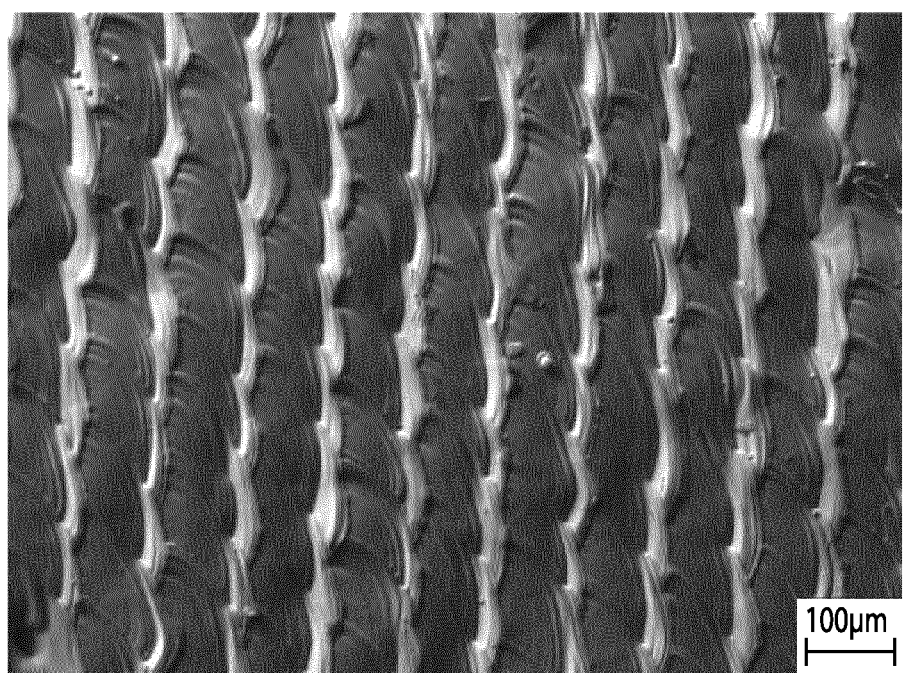
FIG. 18 is an example of a surface treated by a laser of (157 kW/mm2) irradiance and (67 μs) residence time.

In accordance with the teaching of the present invention and as shown in FIG. 8, a high powered laser 800, such as a $CO_2$ laser, is focused on the surface of a metal pin 810, which is mounted for rotation while simultaneously, being moveable linearly so as to expose full coverage of the external surface of the pin, to the laser beam. Controlled laser pulses cause localised melting and re-solidification of the surface of the pin, thereby altering its surface texture. Each laser pulse results in formation of a defined local micro-pattern on the surface of the substrate with the overall patterned surface texture being the result of the interaction between the plurality of individual local micro-patterns formed by the individual pulses. In accordance with the teaching of the present invention, the following key parameters determine the surface profile created on the metal pin:

laser power, pulse repetition frequency (PRF), percentage overlap of pulses, residence time, spot size, duration of the laser pulse, and laser wavelength. Using laser texturing the amount of material in contact within the interference region can be controlled by varying the laser process parameters in order to create different surface profile textured patterns. Thus the strength of the fit can be well-defined, and varied by varying the process parameters. For examples as shown in FIG. 18 it is possible to provide different textures and Moire patterns that can be established by the combination of the two motions—the rotational motion and the longidunal motion of the pin with the effect of energy density exposures of (a) 5.24 J/⟦mm⟧^2, (b) 10.48 J/⟦mm⟧^2 and (c) 20.96 J/⟦mm⟧^2.

As will be discussed in more detail below, the present inventor has ascertained that particularly process parameters may provide advantageous results. Whilst not intending to limit the present teaching to any one particular set of process parameters, preferred overlap ranges from −50% to +50%, preferred power ranges from 0.01 W to 15 kW, pulse repetition frequency (PRF) from 50 Hz to 20 kHz, and linear translation speeds from $1.0 \times 10^{-7}$ mm/s to 10 m/s have been identified as operational ranges for this process. Higher gas pressure levels of protective gas produced better control of surface profile on metal surfaces due to reduced oxidation and controlled cooling rate. Gas pressures within the range of 0 bar to 10 bar are effective. The process laser spot size could be varied according to the present teaching over a wide range (e.g. from 0.001 to 10 mm in diameter), however most applications are expected to fall within the typical spot size range of 0.01 to 1 mm in diameter.

In particular, control of these parameters, provides repeating patterns both circumferentially and longitudinally with a definable overlap along the pin. This results in the production of specific Moiré patterns on the surface of the pin which are extremely uniform in dimension, reproducible and can be pre-defined. The pin can then be inserted into a corresponding hole as an interference-fit fastener. The strength of the interference—fit fastening joint, measured by the force required to remove the pin from the hole, depends on the generated surface profile. By controlling the above indicated key laser parameters, the strength of the fit is controllable, reliable, and reproducible.

Thus, the present teaching advantageously provides a fast and low-cost alternative method to any of the known methods for producing interference-fit joints. The process allows careful control of the surface texturing which provides for more user-friendly assembly of the fastening element with the corresponding hole, due to the well-defined insertion forces, and increased reliability in the joint bond strengths.

A method of producing these Moiré texture patterns for control of interface bonding force using the laser per the present teaching may include the following steps which are presented in the context of the surface texturing of a longitudinal surface of a pin having a cylindrical pin geometry. It will be appreciated and understood that numerous alternative pin shapes could equally be subjected to the processing herein described but the specifics of the following steps may vary dependent on the underlying geometries. Accordingly, the process of the present invention comprises the following steps for producing a desired pre-determined pattern on a cylindrical pin shape where the longitudinal surface is to be textured:

1. The pin part to be laser textured is mounted normal to the laser beam propagation direction in a rotational chuck.
2. The pin part is located such that the required laser spot size is achieved on the top surface of the pin.
3. The sample is rotated at a predetermined speed.
4. The laser is set to start pulsing at a specific pulse repetition frequency, PRF, and power and concurrently an inert gas may be passed along the surface during processing to prevent any oxides from forming; this inert and other gas may be used to control the cooling rate.
5. The pin is passed under the pulsing laser been while it is rotating at a set speed. Alternatively, the laser beam path is altered (rather than moving the sample) in order for it to be passed along the length of the part, by a galvanometer for example.
6. Once the pre-determined required length of the pin surface is textured, the laser and part movement is stopped and the sample is released.

The method of the present invention advantageously provides pre-defined Moiré pattern designs using carefully controlled parameters associated with the laser beam control and operation. Specific Moiré pattern designs provide benefits due to at least the following:

Achieving a definable level of bonding force by controlling volume of interfering profile and shape/direction of micro-texture;
improvement in repeatability of bonding force achieved;
More defined fatigue life times of produced joints;
Highly repeatable control over pin micro-texture, direction of texture, and the amount of interaction between the mating surfaces;
Higher control than previously available over interference fit assembly force and pull out force (i.e. bond strength);
Definable levels of elastic and plastic strain for control of material deformation and joint life times;
The ability to make the connection in a simple, user-friendly manner due to the one component design and the ability to make the connection using access at either side of the joint, as access is sufficient from only one side; and
Low cost of producing the interference fit connecting member.

Significantly, a process per the present teaching provides higher control, precision, and repeatability of the surface texture, and thus the amount of interaction between the mating surfaces. This allows for greater control of the insertion and removal forces, increasing the ease of assembly and giving more reliable, safer press fit engagement between the mating surfaces. The ease of assembly and regularity of the surface pattern can be defined to cause less severe plastic deformation which consequently results in longer joint life times. The method of the present invention requires access only from one side for insertion or removal, providing an easier and more user friendly joint implementation technique. The lack of requirement for heating/cooling, welding, adhesives, and other additional equipment or processes can make this method relatively fast and low-cost.

Examples of products that can be produced using the system and method of the present invention include, for instance, laser-processed interference-fit pins and component sections in order to join two structural sections with defined insertion forces and bonding strengths. It will be appreciated that end use applications will be those that require or benefit from the use of an interference fit fastener. These fasteners are widely used in automotive and aerospace industries. The amount of material in contact between the two surfaces will be a key factor in determining the strength of the joint and as a result the actual specifics of the patterns that are provided on the pin surface are dependent on the specifics of the required strength of the joint.

Figure 1:
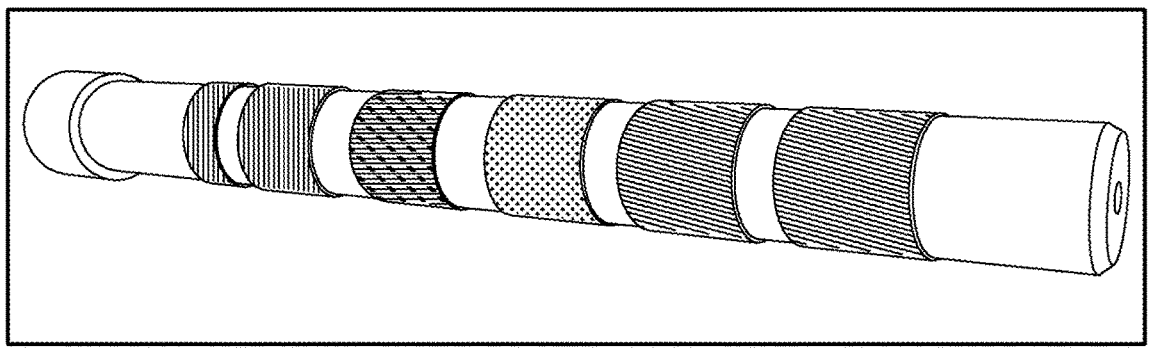
FIG. 1 is a perspective view of a 10 mm diameter stainless steel (SS) pin with a plurality of differently textured surfaces prepared on portions along the length of the pin to demonstrate a number of examples of the various textures that can be produced.

Referring now to FIG. 1, an example of six different Moiré patterned micro-profiles are provided at separate locations longitudinally spaced along a 100 mm long stainless steel pin. As is evident from an inspection of this part, a method per the present teaching provides very highly defined micro-profiling which is not heretofore known and certainly not heretofore known in interference fit, e.g. press-fit, connections.

The method of the present invention produces surface profiles not only with defined repeating profiles and root mean square roughness in any one direction but can also produce a pre-definable directionality within these profiles. The method of the present invention is a fast micro-profiling process which provides greater control over the texture depth, regularity, and directionality compared to alternate mechanical texturing techniques. The six examples of differing surface textures shown along the length of the pin in FIG. 1 clearly establishes that the patterning can be perpendicular, parallel and at varying angles to the main pin axis. This ability of the method of the present invention to control the precision and repeatability of the surface profile allows in a much more exact manner control of the subsequent joint assembly and disassembly load levels.

Figure 2:
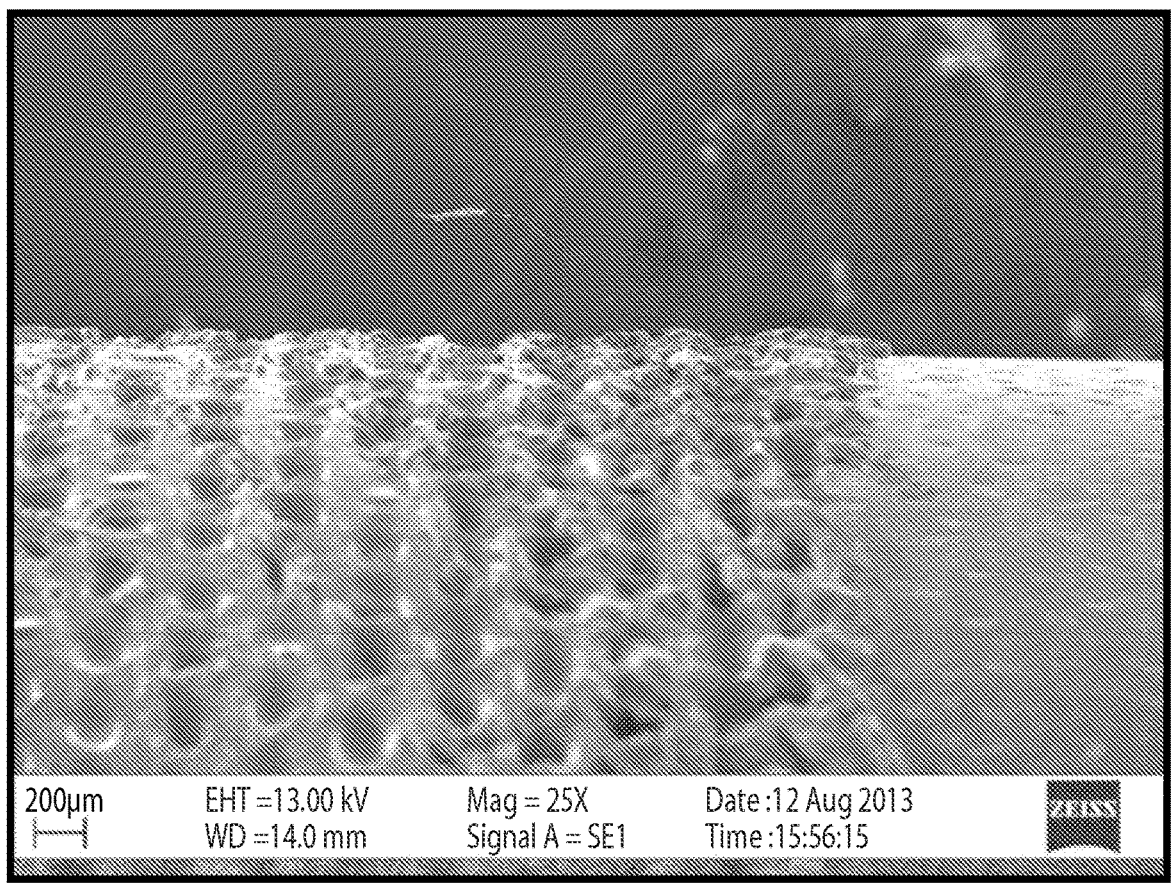
FIG. 2 is an SEM image of a portion of a pin textured in accordance with the present teaching.

Thus the present invention overcomes the shortcomings of the known press-fit fastening connections. In comparison with conventional technologies, the present invention provides higher control, precision and repeatability over the surface profile and profile pattern. By controlling the percentage overlap of laser spot in the longitudinal and circumferential directions, pre-determined defined Moiré patterns are generated on the pin surface, as shown in FIG. 1. FIG. 2 gives an example from SEM analysis of one such surface pattern from which it can be seen that the results of the laser patterning are well defined structures formed on the outer surface of the pin.

Figure 3:
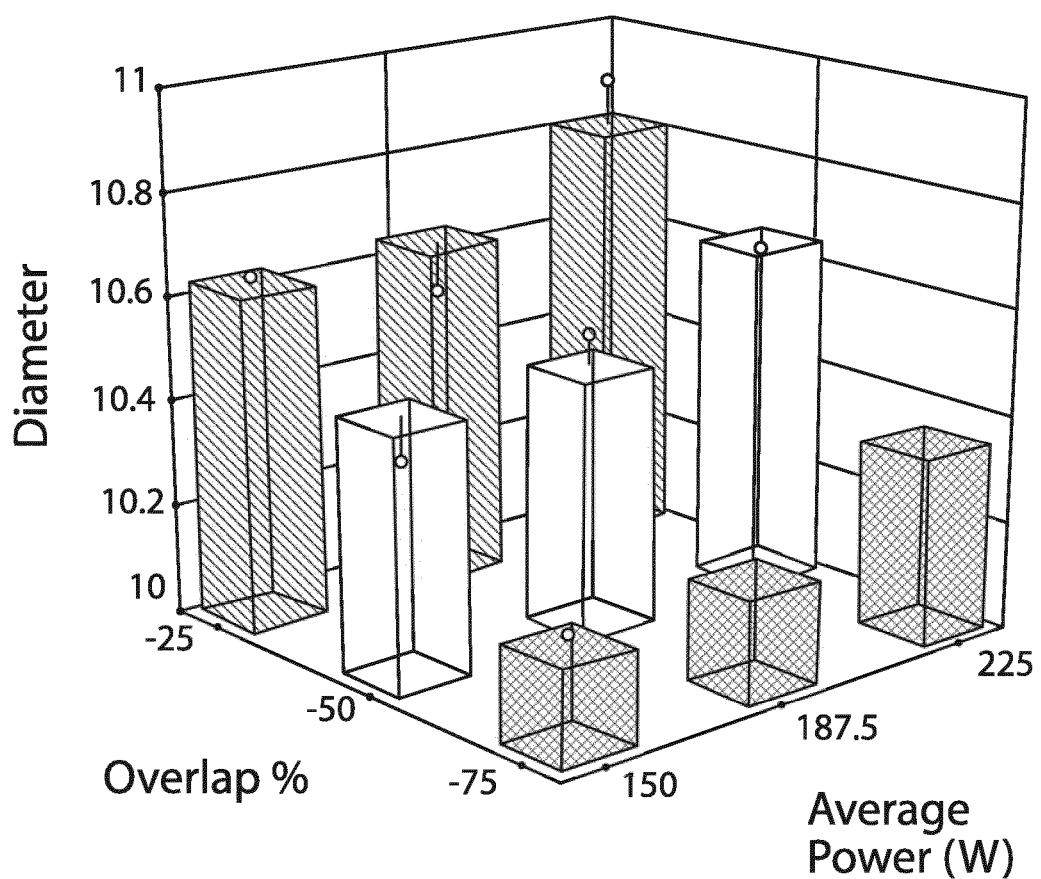
FIG. 3 is a graph indicating how laser power and % overlap can be varied to achieve different pin diameters in accordance with the teaching of the present invention.
Figure 4:
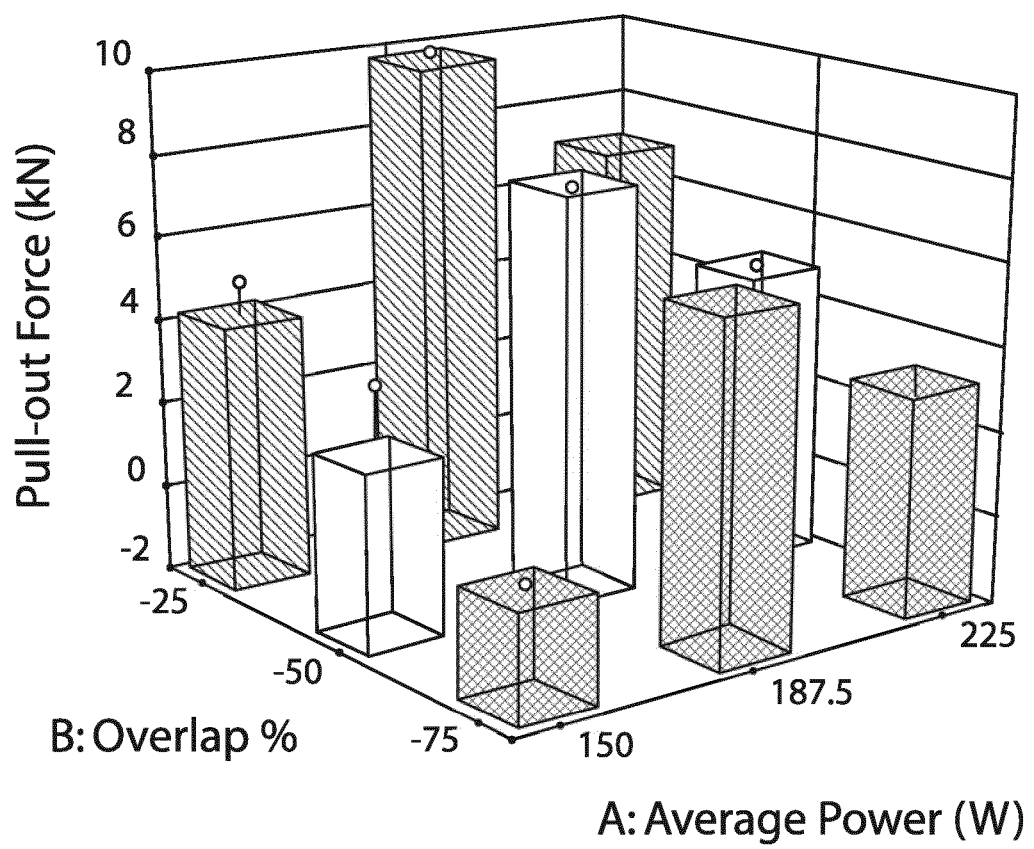
FIG. 4 is a graph indicating how laser parameters can be used to give different pull out forces (resulting from the induced roughness and pattern texture direction) provided in accordance with the teaching of the present invention.

FIG. 3 shows how variations in laser power and pulse overlap can be used to define the micro-profile pattern height and hence diameter of the pin. In these tests carried out, the starting 10 mm stainless steel pin diameter was textured to give final pin diameters between 10.1 and 11 mm. Variation in insertion and pull out forces between 1 and 10 kN were recorded for insertion of these pins into a hole diameter of 10.1 (+/−0.02 mm), as shown in FIG. 4. Five repetitions of samples (with pin and mating hole diameter) were tested in order to produce the 95% confidence level bars shown in FIGS. 3 and 4.

The results have shown that the process is very repeatable and that the bond strength can be set simply by setting the laser processing parameters. The process of the present invention is highly repeatable and provides high levels of control over pin diameter, direction of texture, the amount of interaction between the mating surfaces, and ultimately higher control than previously available. From the testing done so far the bond strengths are very variable from approximately 0.001 N to 30 kN, depending on the texture imparted from the laser processing. The 30 kN load level is high load value. It will be appreciated, that the area over which this load is placed would often not be given in specifications for joint connections. However for the sake of reliable comparisons between joint systems, for a 10 mm diameter pin inserted into a mating hole along a 10 mm length of contact in the mating hole, a load area is defined as the interface area between the laser textured pin and the hole. For these exemplary values these dimensions correspond to a cylindrical interface area between the pin and the hole of 0.0031 m2 which when tested with various patterned surfaces could provide the above mentioned bond strength. It will be appreciated that it is not intended to limit the present teaching to any one set of load levels as these will depend on the specifics employed.

Figure 5:
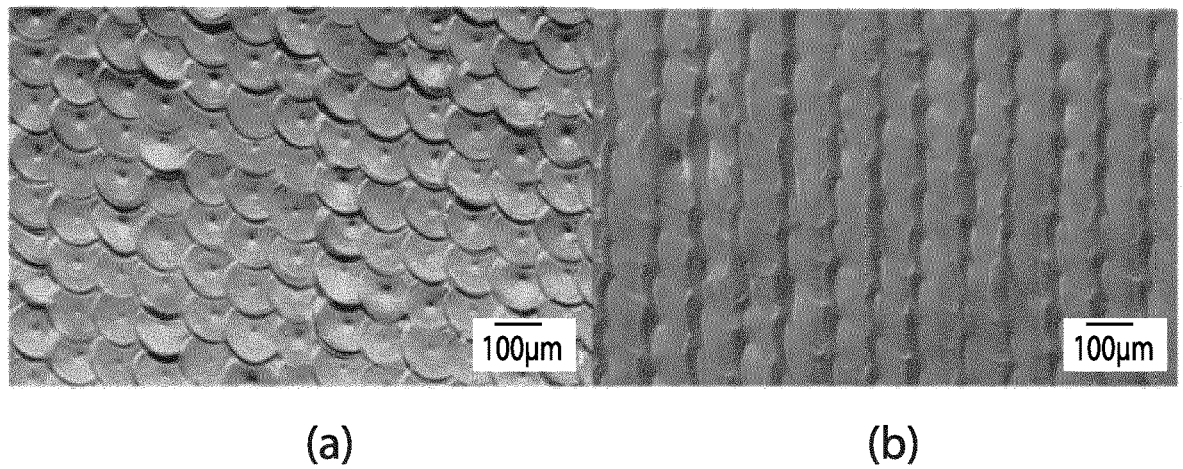
FIGS. 5 (a) and (b) are SEM images of 316 L stainless steel substrates showing two different patterns produced in accordance with the present teaching.
Figure 6A:
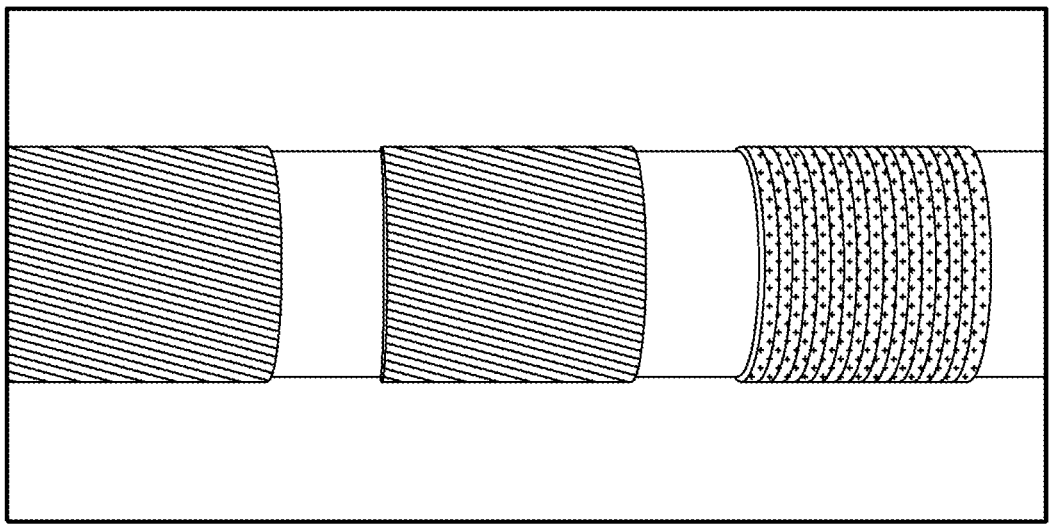
FIG. 6a and FIG. 6b show examples of different pins fabricated in accordance with the present teaching.
Figure 6B:
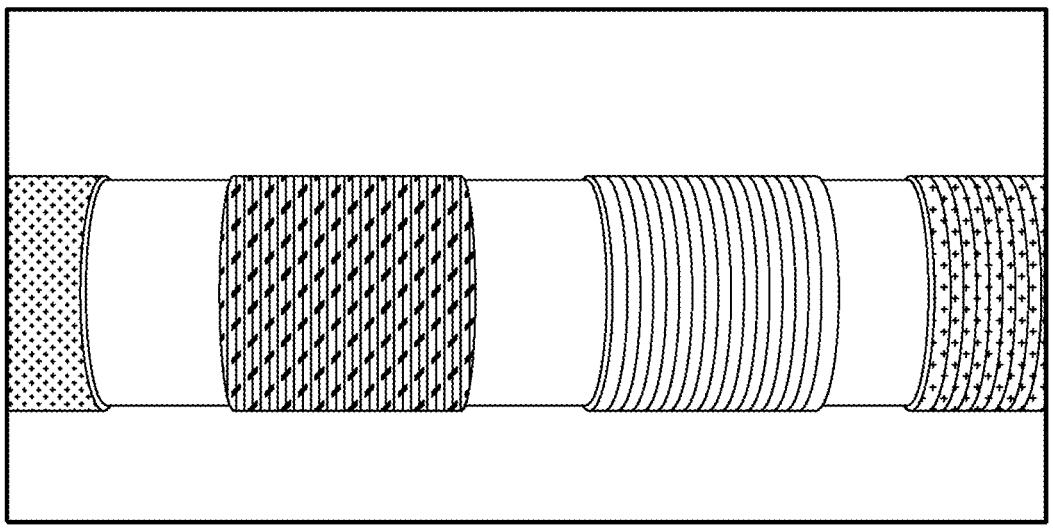
Figure 7:
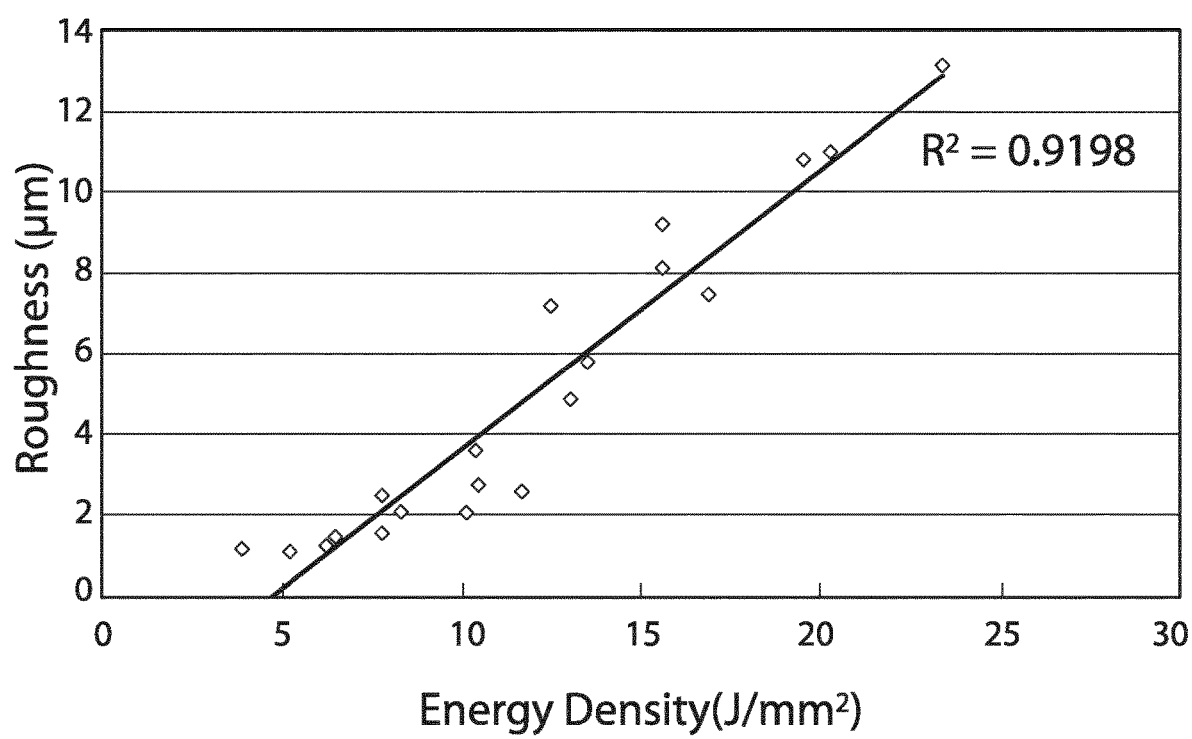
FIG. 7 is a graph showing the relationship control between average surface roughness and laser irradiation energy density.

The effects of laser surface remelting processing conditions on meltpool profile, microstructure, roughness, hardness, and chemical composition were analysed. By regulation of the laser processing parameters it is possible to controllably melt and re-solidify the surface (see the exemplary fabricated parts of FIGS. 5 & 6). Surface profile can be finely controlled with profile height and roughness increasing for increased residence time and energy density. An example of precision and control achievable is shown in FIG. 7 where the results of analysis of varying the energy applied by the laser on the resultant surface roughness is illustrated. The control afforded over surface topology is the main benefit of this process in terms of providing a new fastening method. An increase in hardness was achieved for the laser processing conditions relative to the untreated surface. As opposed to a coating process, a benefit of the process of the present invention is that the textured surface is of the same material type to the substrate and thus remain perfectly bonded. Other metals, including titanium and cobalt chrome have also been similarly successfully textured using the process of the present invention.

Many insertion and extraction experiments tests have been conducted using these pins to examine the bounds within which this process will work for slight variations in mating hole size and pin diameter. Power, pulse repetition frequency, percentage overlap of laser spots, and sample translation speeds were varied to allow for precise fine control of the energy density per unit time and per unit area. In testing carried out, 316L stainless steel pins were manufactured with the dimensions of 50 mm in length and 10 mm in diameter. 316L stainless steel cylindrical plates were manufactured with varying inner-hole diameters from 10.0 mm to 10.3 mm (+/−0.02 mm) in steps of 0.1 mm to investigate the levels of force control (insertion, extraction) achievable. The surface of these pins was laser treated and the resultant pins were inserted into the 316L stainless steel cylindrical plates. The insertion and extraction forces were recorded via conventional compression and tensile testing methods according to recognised fastening test standards. In these tests, repeatable control of laser micro-profiled height from 0.1 mm to 1.5 mm as well as the corresponding insertion and pull out forces were tested and the test results show that the process is very repeatable and robust.

Figure 9:
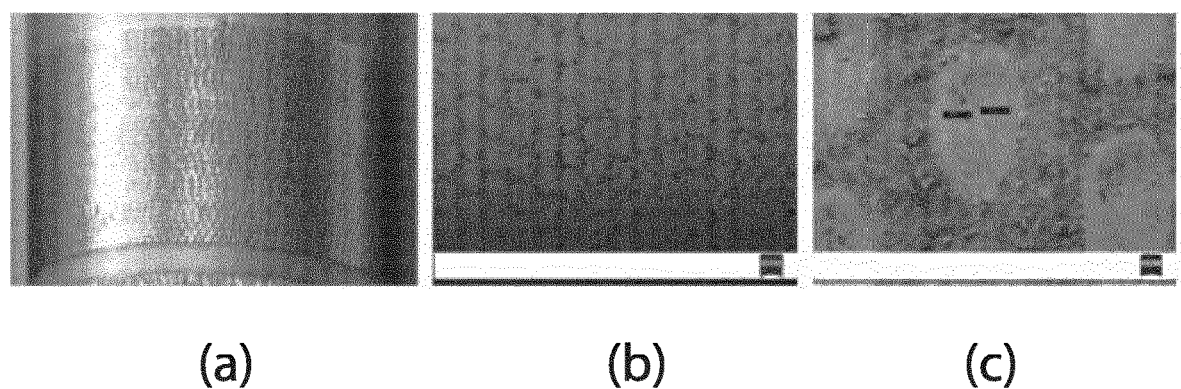
FIGS. 9 (a), (b) and (c) show a sample as processed by a 200 W $CO_2$ laser operating at 100 Hz and −50% overlap.
Figure 10A:
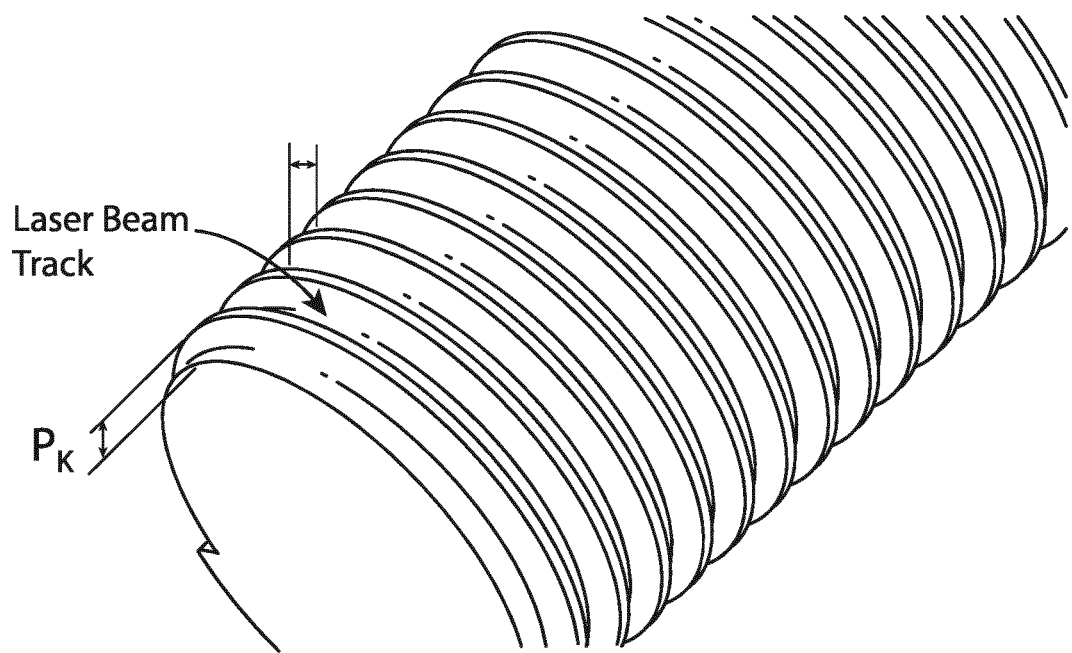
FIGS. 10A and 10B show in schematic form a pin fabricated through the use of laser surface texturing in accordance with the present teaching, with the sample surface modified to a bigger diameter due to the laser beam melting and ablation of material and the subsequent solidification of melted material—FIG. 10A.
Figure 10B:
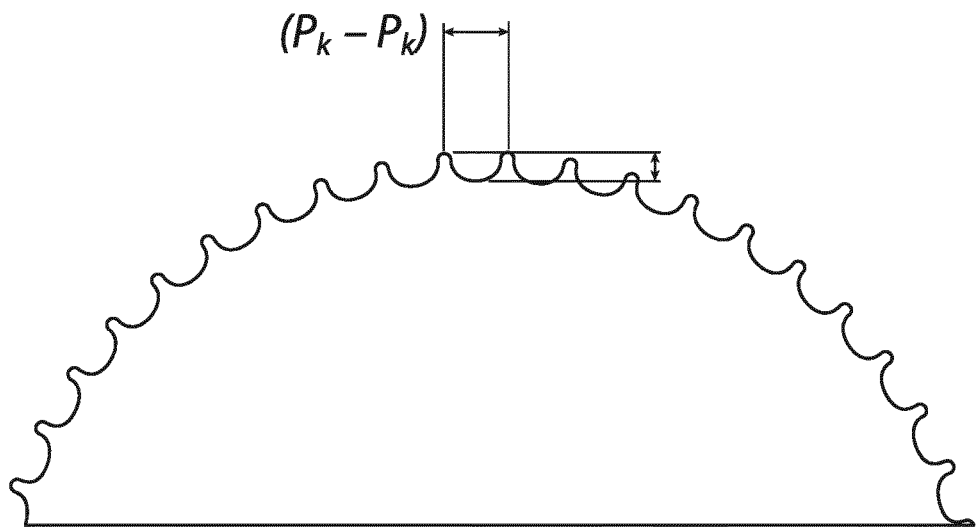

An investigation for the threshold of the minimum power needed to melt the surface was performed. FIG. 9 shows the effect of a sample processed by 200 W, 100 Hz and −50% overlap. FIG. 9 (a) shows the actual image of the processed surface, FIG. 9 (b) shows a magnified view of the resulting tracks of individual pulses of the laser beam and FIG. 9 (c) shows the a magnified view of an individual pulse and resulting dimensions of the melt pool. It is demonstrated that manipulating laser parameters to higher values in terms of power, frequency and overlap would result in increasing of the melt pool size and the build-up of material on the surface resultant from each laser pulse. From FIG. 10 (c), it is clear that in this case the width of the melt pool is equal to the set laser beam focused spot diameter (0.2 mm) indicating that the surface was just melted and that the resulting melt would have cooled very quickly. The length of the melt pool is 300 μm, which is bigger than the spot diameter due to this being the rotational direction where the beam would have resided on the surface for a slightly longer period. While discussed in the context of focused, the patterning process may also work with the laser beam focused on, below and above the surface. In certain aspects the having the laser beam focussed below the surface provides advantageous results but other configurations are also possible within the context of the present teaching.

Effect of Percentage Overlap

Overlap percentage is defined as the percentage of overlap between one laser spot diameter and the next laser spot diameter that lands on the surface next to it. Hence, the zero overlap indicates that the laser spots in both circumferential and axial directions are arranged in a tangential manner as shown in the FIG. 11a. An example of a positive percentage overlap is indicated in FIG. 11b. A negative overlap indicates unprocessed sections on the surface between successive laser spots.

Figure 11:
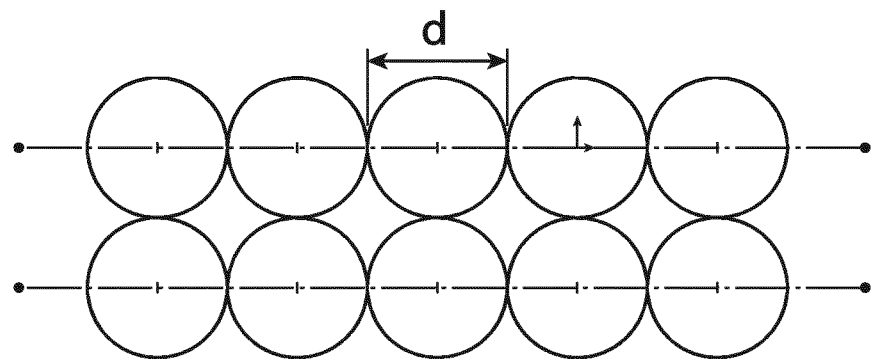
FIG. 11 (a) shows the results of a pattern fabricated with zero % overlap.
Figure 11:
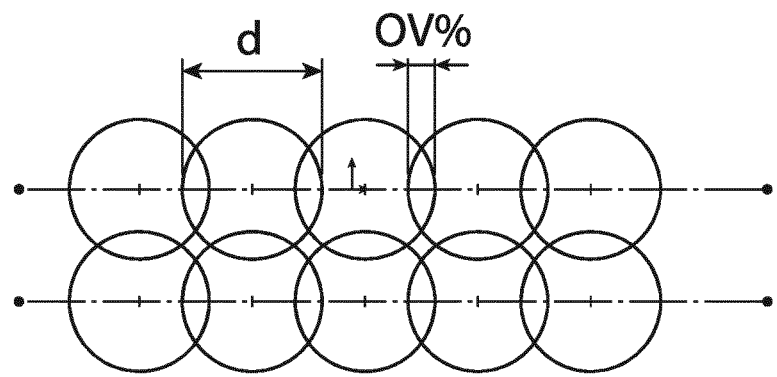
Figure 17:
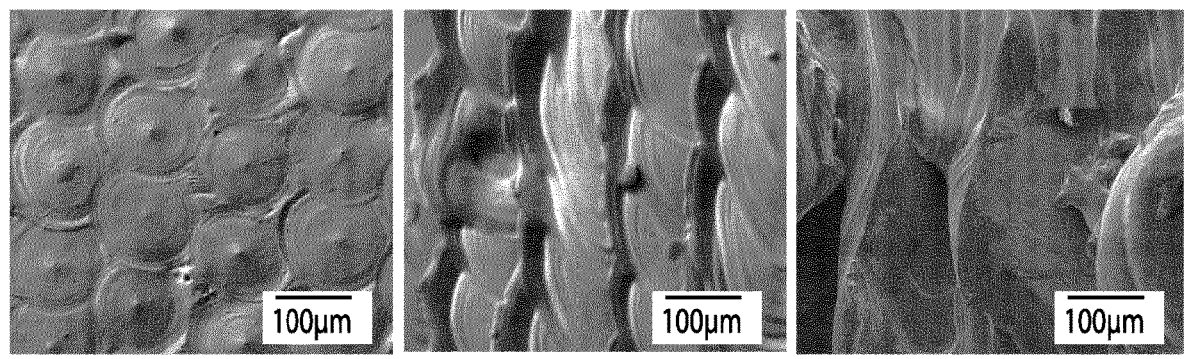
FIG. 17 shows examples of different textures and Moire patterns that can be established by the combination of the two motions—the rotational motion of the pin and the longidunal motion of the laser with the effect of energy density on the surface treatment of a pin exposed to (a) 5.24 J/$mm^2$, (b) 10.48 J/$mm^2$ and (c) 20.96 J/$mm^2$.

Referring to FIGS. 11 (a) and (b), the level of overlap can be predetermined by defining the level of PRF, longitudinal and rotational speed as is demonstrated with reference to FIG. 17. The PRF value used may be calculated as follows:

1. For the zero overlap scenario:

By dividing the pin's circumference by the spot diameter to find the number of spots per one revolution of the pin we find: n=number of pulses/rev=$\pi D/d$; where D is the pin's diameter and d is the spot diameter. Multiplying by the number of revolutions per second, $\omega(rpm)/60$, we get: Pulse Repetition Frequency (PRF)=$\pi D\omega/60d$.

2. For any overlap percentage scenario:

The value of the overlap must be added to the latter equation to produce:

$$PRF=\pi D\omega(1+OV\%)/60d.$$

Hence, the tangential (circumferential) overlap percentage OV %=$[(PRF \times 60 \times d)/(\pi D\omega)-1]\times 100$ where, PRF is the pulse repetition frequency, d is the spot diameter, D is the pin sample diameter and $\omega$ is the rotational speed. The linear translation speed of the stage, U (mm/s) for the same value of overlap in the axial direction is: U=$d\omega$(1−OV %)/60. For further clarification, FIG. 12 shows a schematic for the three possible types of overlap on one sample pin surface.

Figure 12:
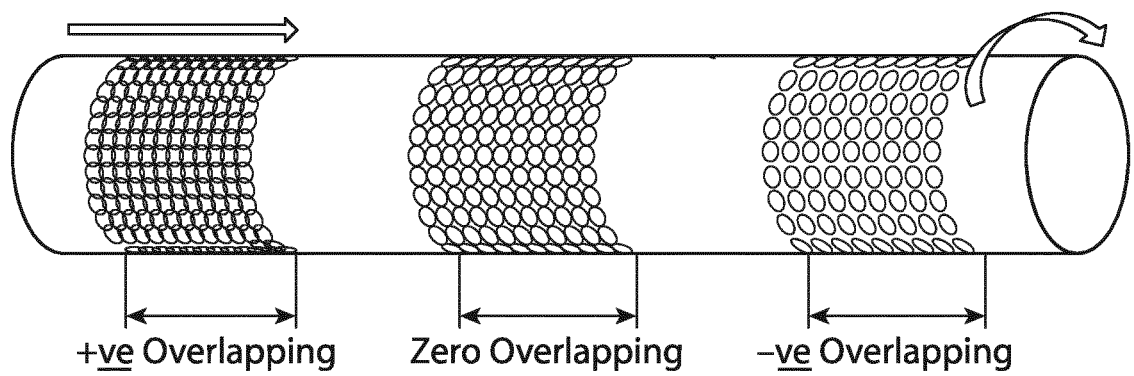
FIG. 12 is a schematic diagram showing the three possible degrees of overlap, including zero overlap, positive overlap and negative overlap.
Figure 13:
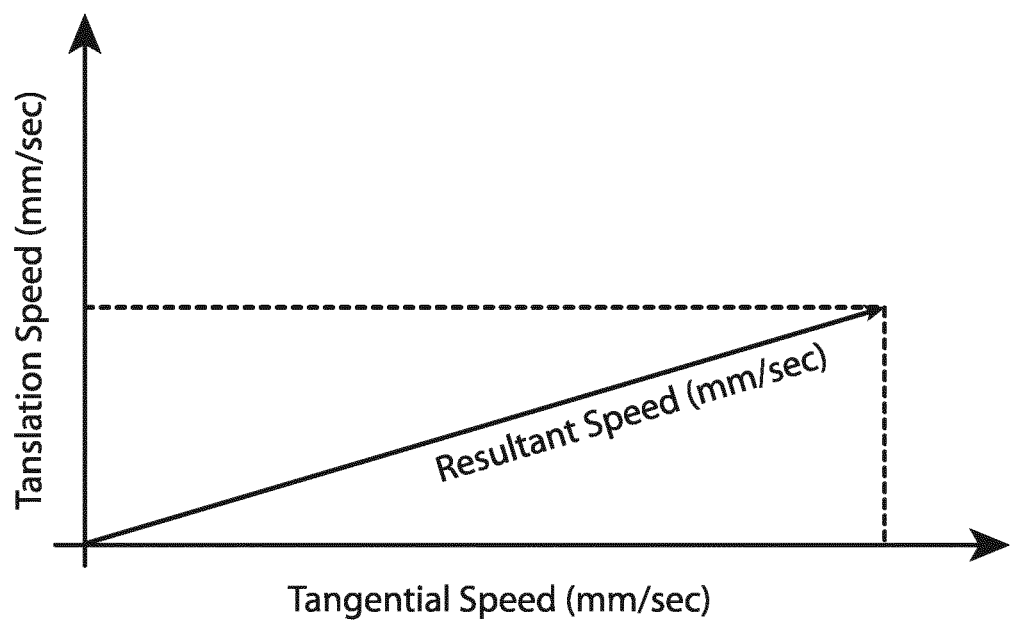
FIG. 13 is a diagram showing the resultant laser beam linear scanning speed from the combined effect of the translational and tangential scanning speeds on a cylindrical surface.

Referring to FIG. 12, the speed employed in the calculations of the heat, specific energy and residence time is the total resultant speed of two components. These are, the linear translation speed (mm/sec) and the tangential speed created by the rotation of the pin sample (mm/sec), refer to FIG. 13. The latter component can be found as:

Tangential speed=$\pi \times$pin diameter (mm)$\times$rotational speed (rev/sec).

Figure 14:
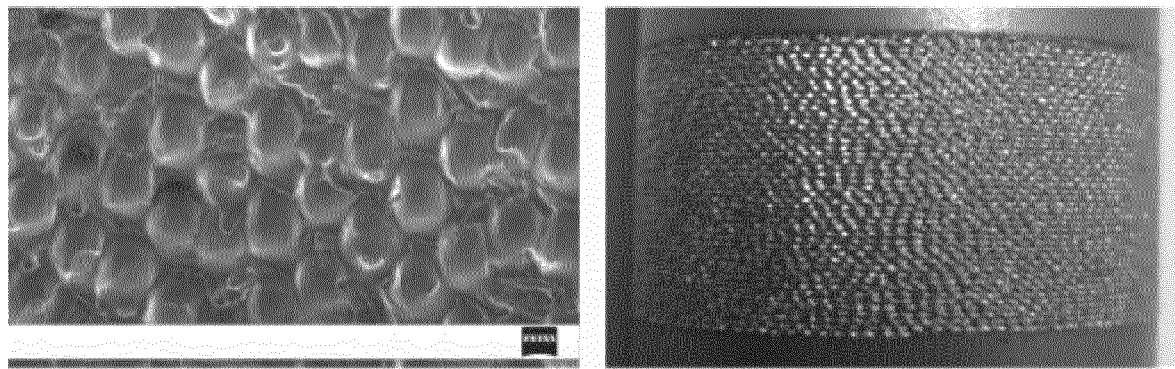
FIG. 14 shows SEM and microscope pictures of an example of a SST 304 pin surface as processed with a laser operating at 700 W, 1500 Hz and with −10% overlap between the laser spots.
Figure 15:
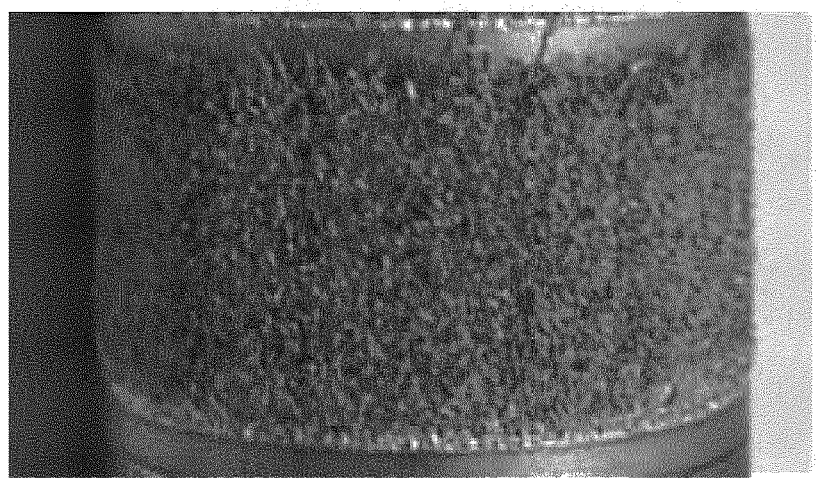
FIG. 15 shows examples of samples produced in a defined environment of 4 bar of Argon gas and various processing conditions with FIG. 15(a) showing the pattern resultant from use of a 500 W laser operating at 500 Hz and with +20% overlap between the laser spots, FIG. 15(b) showing the pattern resulting from the use of a 500 W laser operating at 1500 Hz and −20% overlap
Figure 15:
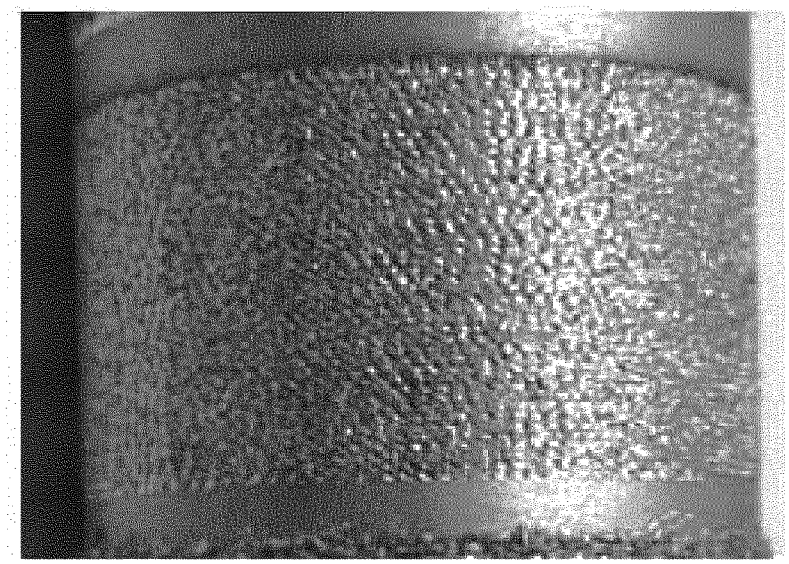
Figure 15:
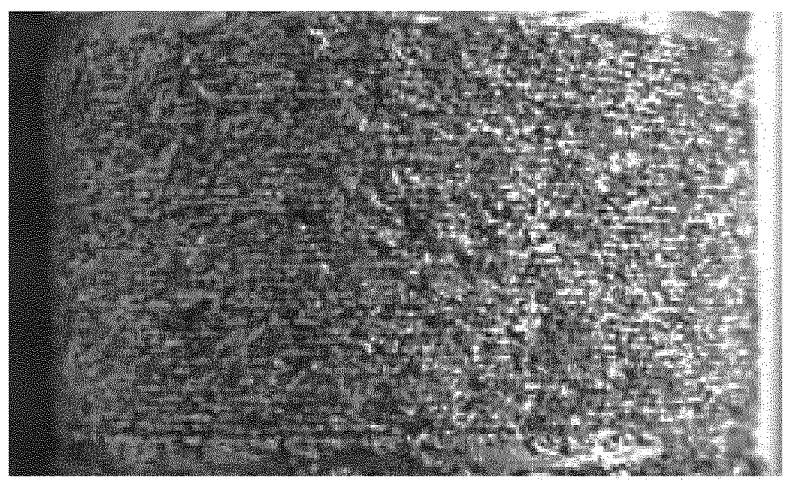
Figure 16:
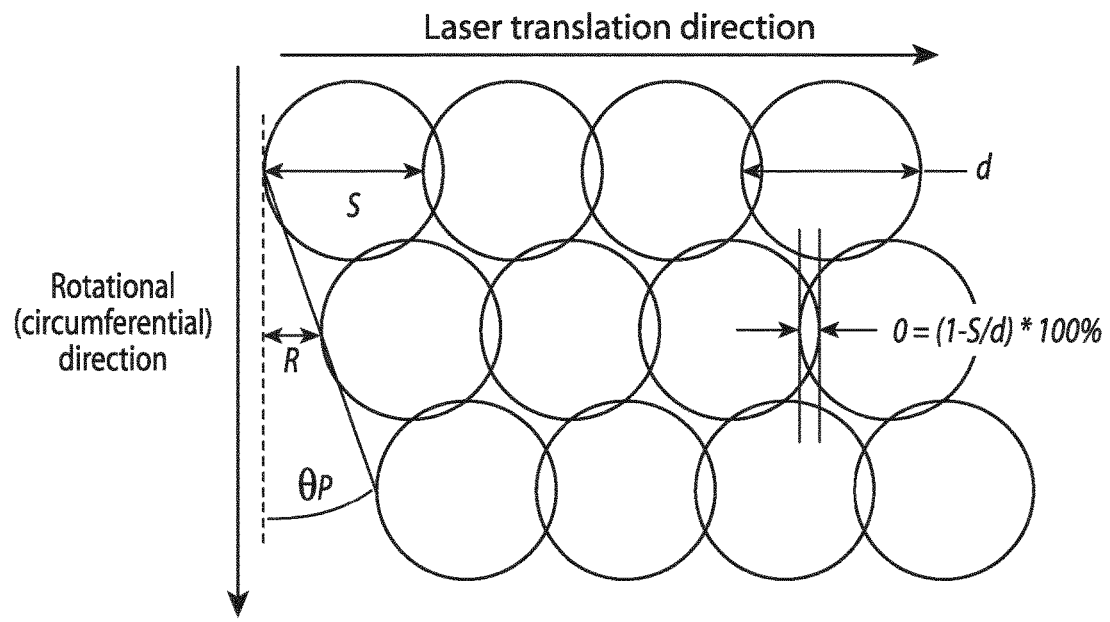
FIG. 16 is a schematic showing fabrication of a laser pattern at the surface, with the distance between successive shots (S), the offset (R), the laser spot diameter (d), spot overlap (O), and the pattern angle ($\theta_P$)

FIG. 14 shows an example of a stainless steel 304 pin surface as processed with 700 W, 1500 Hz and −10% OV. FIG. 15 shows samples produced under 4 bar of argon gas and various processing conditions; FIG. 15 (a) shows the pattern resulting from the following conditions: 500 W, 500 Hz and 20% overlap; FIG. 15 (b) shows the pattern resulting from the following conditions:500 W, 1500 Hz and −20% overlap; FIG. 15 (c) shows the pattern resulting from the following conditions: 300 W, 100 Hz and 0% overlap. FIG. 16 show in schematic form a corresponding fabrication of a laser pattern at the surface, with the distance between successive shots (S), the offset (R), the laser spot diameter (d), spot overlap (O), and the pattern angle ($\theta_P$) being parameters that are usefully used to understand the relationship between individual spot arrangements. FIG. 17 shows examples of different textures and Moire patterns that can be established by the combination of the two motions—the rotational motion of the pin and the longidunal motion of the laser with the effect of energy density on the surface treatment of a pin exposed to (a) 5.24 J/⟦mm⟧^2, (b) 10.48 J/⟦mm⟧^2 and (c) 20.96 J/⟦mm⟧^2. FIG. 18 is an example of a surface treated by a laser of (157 kW/mm2) irradiance and (67 µs) residence time.

As indicated above, the system and method of the present invention finds application in the transportation industries, including manufacturers of aerospace transportation, automobiles, buses, and trains. Interference-fit pins are used extensively in the transportation industry. Their uses range from small pins for locking aluminium to composite components, to much larger pins for holding wings and tail fins of aeroplanes to the main spaceframe. While the technology works very well once in place, in many instances shrink fits are used either by heating the outer region or by cooling the pin section via liquid nitrogen. As mentioned above, this shrink fit methodology has known associated problems resulting in joints of lower life times and higher related costs (time and resources). Transportation industries are continuously investigating new methods to reduce these extensive costs. Technology development is required which will provide known insertion and removal forces for these press interference fits whilst assuring operational reliability.

The present invention provides a method and a system for the surface micro-profiling of interference pins used for connectors within and across a number of industries including the transportation industry in order to replace known fastening devices and methods. Thus the present invention provides a new joining system that is user-friendly which requires known force levels for assembly and disassembly. The method of the present invention provides a laser micro-profiling method of pins for press-fit joints and has the advantage of resulting in a relatively fast, low-cost and highly reliable solution for the fixation and disassembly to a wide range of range of connection requirements across industries such as the transportation industry including aeronautical and automotive.

Laser Surface Treatment and Laser Parameters:

Lasers have several advantages over the conventional techniques that are normally used in material processing. These include:

The ease with which the beam power can be controlled by regulating the current through the electrical discharge.

Minimal contamination of the process.

Ability to manipulate the beam into ordinarily inaccessible areas using mirrors and fiber optic cables.

Minimal heat-affected zone and distortion.

Non-contact nature of the process.

The words comprises/comprising when used in this specification are to specify the presence of stated features, integers, steps or components but does not preclude the presence or addition of one or more other features, integers, steps, components or groups thereof.

The invention claimed is:

1. A method of fabricating an interference fit fastening element having a defined bonding strength by forming a pattern within the surface of the element, the method comprising:

mounting the element for rotational and longitudinal movement relative to a laser; and moving the element in both a longitudinal and rotational direction relative to the laser while concurrently irradiating a surface of the element with a plurality of laser pulses, the laser pulses having associated defined laser processing parameters, so as to form a plurality of laser spots extending along a defined patterned region of the element, each pulse effecting a localised melting and re-solidification of the surface of the element, the resultant pattern from an overlap of adjacent laser spots adjacent to one another along the longitudinal direction formed from the plurality of pulses extending about the circumference of the element in the defined patterned region in both a the longitudinal and transverse direction and defining a localised defined Moire pattern in the defined patterned region, the defined Moire pattern having an associated bonding strength set by the laser processing parameters of the laser pulses;

wherein the laser is operated in power ranges from 0.01 W to 15 kW.

2. The method of claim 1 wherein each laser pulse effects formation of a micro-profiled grooved surface.

3. The method of claim 2 wherein the micro-profiled grooved surface has features having heights in the range from 0.1 mm to 1.5 mm.

4. The method of claim 1 wherein each pulse forms a defined pattern on the surface, the method further comprising controlling overlap between the defined pattern provided by neighbouring pulses.

5. The method of claim 4 wherein the overlap is within the range of −50% to +50%.

6. The method of claim 1 wherein the laser has a pulse repetition frequency from 50 Hz to 20 kHz.

7. The method of claim 1 wherein the element and the laser are operably moved relative to one another at linear translation speeds in the range $1.0 \times 10^{-7}$ mm/s to 10 m/s.

8. The method of claim 1 comprising providing the element within a controlled environment during the irradiation of the element.

9. The method of claim 8 wherein the controlled environment is within a pressure range of 0 bar to 10 bar.

10. The method of claim 8 wherein the controlled environment includes noble and other gas environments.

11. The method of claim 1 wherein each laser pulse effects formation of a laser spot on the surface of the element.

12. The method of claim 11 wherein each laser spot has a diameter ranging from 0.001 mm to 10 mm.

13. The method of claim 1 wherein the element comprises a curved surface.

14. The method of claim 1 wherein the element is mounted normal to the laser beam.

15. The method of claim 1 wherein at least one of the plurality of laser spots is focussed or defocussed on the surface of the element.

16. The method of claim 1 comprising rotating the element at one or more predetermined speeds.

17. The method of claim 1 comprising pulsing the laser at a specific pulse repetition frequency, PRF, and power and concurrently exposing the surface of the element to an inert gas.

18. The method of claim 17 wherein the PRF is in the range from 50 Hz to 20 kHz.

19. The method of claim 1 wherein the respective set of defined laser processing parameters associated with the selected first defined Moire pattern specifies a linear translation speed between the laser and the interference fit fastening element of a range $1.0 \times 10^{-7}$ mm/s to 10 m/s, and moving the interference fit fastening element in both a longitudinal direction and a rotational direction relative to the laser while concurrently irradiating a surface of the interference fit fastening element with a plurality of laser pulses comprise moving the interference fit fastening element in the longitudinal direction at the specified linear translation speed which is in the range $1.0 \times 10^{-7}$ mm/s to 10 m/s.

20. A method of fabricating an interference fit fastening element by forming a pattern within the surface of the element, the method comprising:

selecting a first defined Moire pattern from a plurality of defined Moire patterns based on a specified bonding strength for the interference fit fastening element, each of the defined Morire patterns associated with a respective set of defined laser processing parameters, each set of the defined laser processing parameters at least including a respective specification of overlap of adjacent laser spots to be formed on a surface of the interference fit fastening element to obtained the specified bonding strength;

mounting the interference fit fastening element for rotational and longitudinal movement relative to a laser; and moving the interference fit fastening element in both a longitudinal direction and a rotational direction relative to the laser while concurrently irradiating a surface of the interference fit fastening element with a plurality of laser pulses according to the respective set of defined laser processing parameters associated with the selected first defined Moire pattern to form the selected first defined Moire pattern extending along a defined patterned region of the interference fit fastening element from a plurality of laser spots where adjacent ones of the laser spots have a positive or a negative overlap with one another as specified by the respective set of defined laser processing parameters associated with the selected first defined Moire pattern;

wherein the respective set of defined laser processing parameters associated with the selected first defined Moire pattern specifies a power range for operation of the laser of from 0.0 W to 15 kW, and moving the interference fit fastening element in both a longitudinal direction and a rotational direction relative to the laser while concurrently irradiating a surface of the interference fit fastening element with a plurality of laser pulses comprise moving the interference fit fastening element in both the longitudinal direction and the rotational direction relative to the laser while concurrently irradiating the surface of the interference fit fastening element with the plurality of laser pulses with the specified power which is in the power range of from 0.0 W to 15 kW.

21. The method of claim 20 wherein the respective set of defined laser processing parameters associated with the selected first defined Moire pattern specifies an overlap between longitudinally adjacent laser spots along a longitudinal axis to be within a range of −50% to +50%, and moving the interference fit fastening element in both a longitudinal direction and a rotational direction relative to the laser while concurrently irradiating a surface of the interference fit fastening element with a plurality of laser pulses comprise moving the interference fit fastening element in both the longitudinal direction and the rotational direction relative to the laser while concurrently irradiating the surface of the interference fit fastening element with the plurality of laser pulses to obtain the specified overlap between adjacent laser spots within the range of −50% to +50%.

22. The method of claim 20 wherein the respective set of defined laser processing parameters associated with the selected first defined Moire pattern specifies a pulse repetition frequency for the laser from 50 Hz to 20 kHz, and moving the interference fit fastening element in both a longitudinal direction and a rotational direction relative to the laser while concurrently irradiating a surface of the interference fit fastening element with a plurality of laser pulses comprise moving the interference fit fastening element in both the longitudinal direction and the rotational direction relative to the laser while concurrently irradiating the surface of the interference fit fastening element with the plurality of laser pulses with the specified pulse repetition frequency which is in a range of 50 Hz to 20 kHz.

\* \* \* \* \*